US011022309B2

(12) United States Patent
Roh et al.

(10) Patent No.: US 11,022,309 B2
(45) Date of Patent: Jun. 1, 2021

(54) COMBUSTOR, AND GAS TURBINE INCLUDING THE SAME

(71) Applicant: DOOSAN HEAVY INDUSTRIES & CONSTRUCTION CO., LTD., Changwon-si (KR)

(72) Inventors: Ujin Roh, Changwon-si (KR); Junhyeong Park, Daejeon (KR)

(*) Notice: Subject to any disclaimer, the term of this patent is extended or adjusted under 35 U.S.C. 154(b) by 77 days.

(21) Appl. No.: 16/254,703

(22) Filed: Jan. 23, 2019

(65) Prior Publication Data

US 2020/0025381 A1    Jan. 23, 2020

(30) Foreign Application Priority Data

Mar. 19, 2018    (KR) .................. 10-2018-0031694

(51) Int. Cl.
| | |
|---|---|
| *F23R 3/06* | (2006.01) |
| *F02C 7/22* | (2006.01) |
| *F23R 3/16* | (2006.01) |
| *F23R 3/14* | (2006.01) |

(52) U.S. Cl.
CPC .................. *F23R 3/06* (2013.01); *F02C 7/22* (2013.01); *F05D 2240/35* (2013.01); *F23R 3/14* (2013.01); *F23R 3/16* (2013.01); *F23R 2900/00014* (2013.01)

(58) Field of Classification Search
CPC ...... F23R 3/60; F23R 3/04; F23R 3/06; F23R 3/36; F23R 2900/00013; F23R 2900/00014; F23R 3/283; F23R 3/002; F23R 3/50
See application file for complete search history.

(56) References Cited

U.S. PATENT DOCUMENTS

| | | | | |
|---|---|---|---|---|
| 6,145,297 | A * | 11/2000 | Nagafuchi | ............... F02C 9/34 60/39.281 |
| 7,788,926 | B2 | 9/2010 | Johnson et al. | |
| 8,516,819 | B2 * | 8/2013 | Gambacorta | ........ F23M 20/005 60/725 |
| 2008/0236164 | A1 * | 10/2008 | Bunel | ...................... F23R 3/50 60/740 |
| 2012/0279227 | A1 | 11/2012 | Cyril | |
| 2015/0354823 | A1 * | 12/2015 | Koizumi | ................ F23R 3/286 60/737 |

FOREIGN PATENT DOCUMENTS

| | | |
|---|---|---|
| EP | 2302302 A1 | 3/2011 |
| JP | 2017-053276 A | 3/2017 |
| KR | 10-1239784 B1 | 3/2013 |
| KR | 10-1770313 B1 | 8/2017 |

OTHER PUBLICATIONS

A Korean Office Action dated May 11, 2019 in connection with Korean Patent Application No. 10-2018-0031694 which corresponds to the above-referenced U.S. application.

* cited by examiner

*Primary Examiner* — Todd E Manahan
*Assistant Examiner* — Thuyhang N Nguyen

(57) ABSTRACT

The combustor of a gas turbine may include: a burner, including a plurality of nozzles, to eject fuel and air; and a duct assembly, coupled to one side of the burner, to combust the fuel and the air therein and transfer combustion gas to a turbine, where the burner may include a flow guide member to guide a flow of air to be drawn into the nozzles, and a plurality of holes may be formed in the flow guide member.

17 Claims, 9 Drawing Sheets

COMBUSTOR, AND GAS TURBINE INCLUDING THE SAME

CROSS-REFERENCE TO RELATED APPLICATIONS

This application claims priority to Korean Patent Application No. 10-2018-0031694, filed on Mar. 19, 2018, the disclosure of which is hereby incorporated by reference herein in its entirety.

FIELD

Exemplary embodiments of the present disclosure relate to a combustor, and a gas turbine including the same.

BACKGROUND

The statements in this section merely provide background information related to the present disclosure and do not constitute prior art.

A gas turbine is a power engine configured to mix fuel with air compressed by a combustor, combust the mixture of the fuel and the compressed air, and rotate a turbine using high-temperature gas generated by the combustion. Gas turbines are used to drive a generator, an aircraft, a vessel, a train, and so forth.

Generally, gas turbines include a compressor, a combustor, and a turbine. The compressor draws external air thereinto, compresses the air, and then transfers the compressed air to the combustor. Air compressed by the compressor enters into a high-pressure and in high-temperature state. The combustor mixes fuel with compressed air supplied from the compressor, and combusts the mixture of the fuel and the compressed air. Combustion gas (i.e., the combusted mixture of the fuel and the compressed air) generated by the combustion is discharged to the turbine. Turbine blades provided in the turbine are rotated by the combustion gas, whereby power is generated. Generated power may be used in various fields, e.g., for generating electricity, driving a mechanical device, etc.

Air compressed by the compressor is supplied to the combustor. The air drawn into the combustor flows along an interior of the nozzle casing and is drawn into a nozzle. Here, after the air has been supplied toward the nozzle end plate, a flow path of the air is bent in a reverse direction, and the air is supplied to an end of the nozzle by which combustion is performed.

The inventor(s) notes that as such, since the direction of the flow of air for combusting fuel is rapidly changed on the nozzle end plate, strong swirls may be generated during this process. The inventor(s) notes that in strong swirls, there are a lot of speed components biased in a direction misaligned with an intended flow direction or in a reverse direction. The inventor(s) notes that consequently, the swirls cause pressure loss, thus reducing efficiency in the flow of air.

The inventor(s) notes that there is need to come up with measures for improving efficiency in the flow of air by preventing strong swirls from being generated in a nozzle end plate region of the gas turbine, and thereby enhancing not only combustion efficiency and but also the overall efficiency of the gas turbine.

The inventor(s) furthermore notes that a problem may arise in that high-frequency pressure vibration generated in a combustion region is transmitted to a nozzle assembly, thus causing damage to the nozzle assembly.

SUMMARY

In accordance with one aspect of the present disclosure, a combustor may include: a burner including a plurality of nozzles configured to eject fuel and air; and a duct assembly, which is coupled to one side of the burner, configured to combust the fuel and the air therein and transfer combustion gas to a turbine. The burner may include a flow guide member configured to guide a flow of air to be drawn into the nozzles, and a plurality of holes are formed in the flow guide member.

In accordance with another aspect of the present disclosure, a gas turbine may include a compressor, a combustor and a turbine. The compressor is configured to compress air drawn thereinto from an outside. The combustor is configured to mix fuel with the air compressed by the compressor and combust a mixture of the fuel and the compressed air. And the turbine, including a plurality of turbine blades, is configured to be rotated by combustion gas formed by the combustor. Herein, the combustor may include a burner and a duct assembly. The burner has a plurality of nozzles configured to eject fuel and air. And the duct assembly is coupled to one side of the burner and configured to combust the fuel and the air therein and transfer combustion gas to a turbine. Herein, the burner may include a flow guide member installed on a corner part and configured to guide a flow of air to be drawn into the nozzles, and the flow guide member may be configured as a resonator configured to attenuate vibration.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
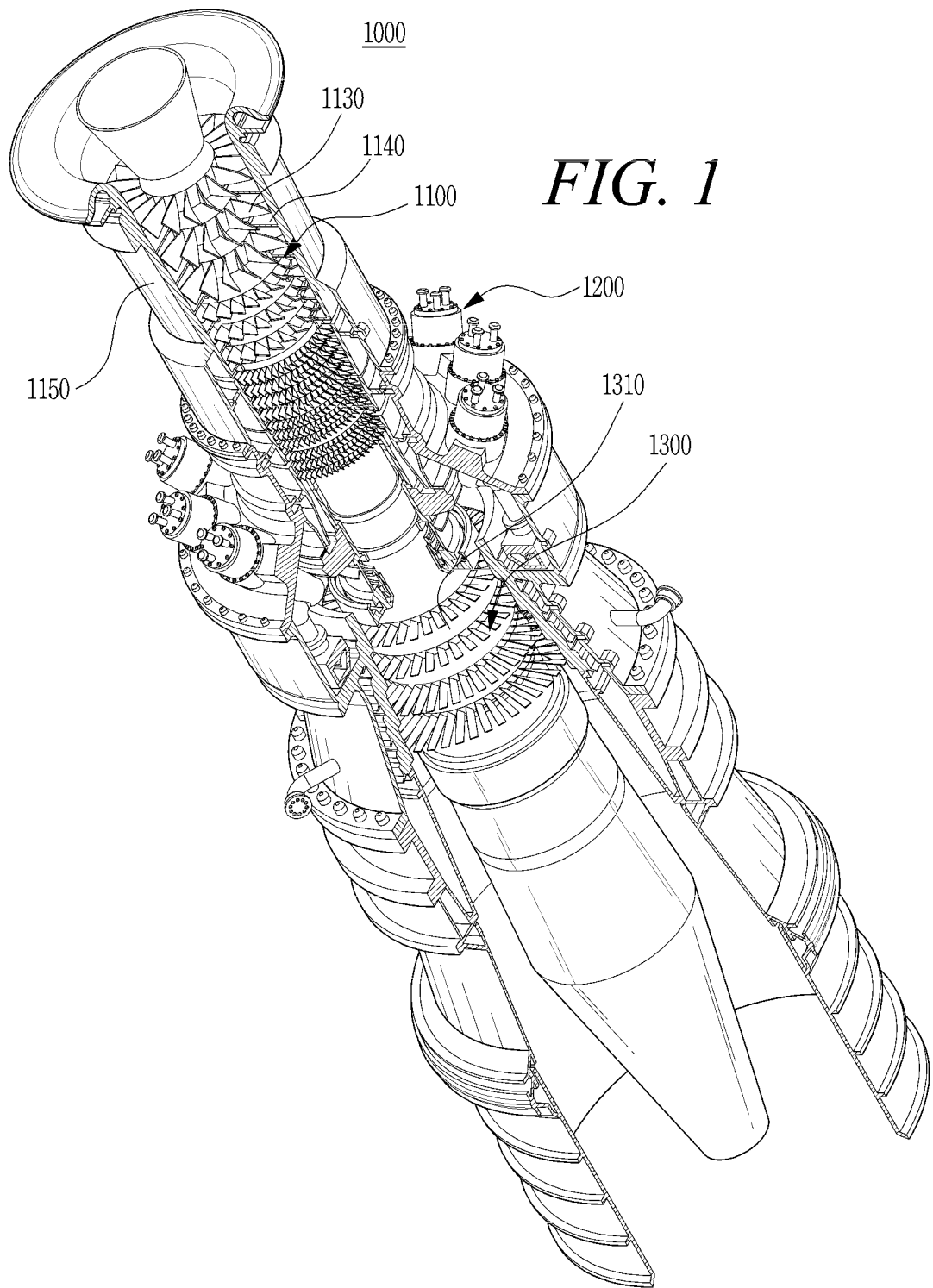
FIG. 1 is a diagram illustrating an internal structure of a gas turbine in accordance with a first exemplary embodiment of the present disclosure.

The present disclosure is to provide a combustor and a gas turbine capable of guiding the flow of air and absorbing vibration.

Exemplary various embodiments and advantages of the present disclosure can be understood by the following description, and become apparent with reference to the embodiments of the present disclosure. Also, it will be clear to those skilled in the art to which the present disclosure pertains that the objects and advantages of the present disclosure can be realized by the means as claimed and combinations thereof.

Since the present disclosure may be modified in various forms, and may have various embodiments, exemplary various embodiments will be illustrated in the accompanying drawings and described in detail with reference to the drawings. However, this is not intended to limit the present disclosure to particular modes of practice, and it is to be appreciated that all changes, equivalents, and substitutes that do not depart from the spirit and technical scope of the claimed invention are encompassed in the present disclosure.

The terminology used herein is for the purpose of describing particular embodiments only and is not intended to be limiting its meaning itself. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, exemplary various embodiments of the present disclosure will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, in the accompanying drawings, some elements are enlarged, omitted, or depicted schematically.

Hereinafter, a gas turbine in accordance with a first embodiment of the present disclosure will be described.

Figure 2:
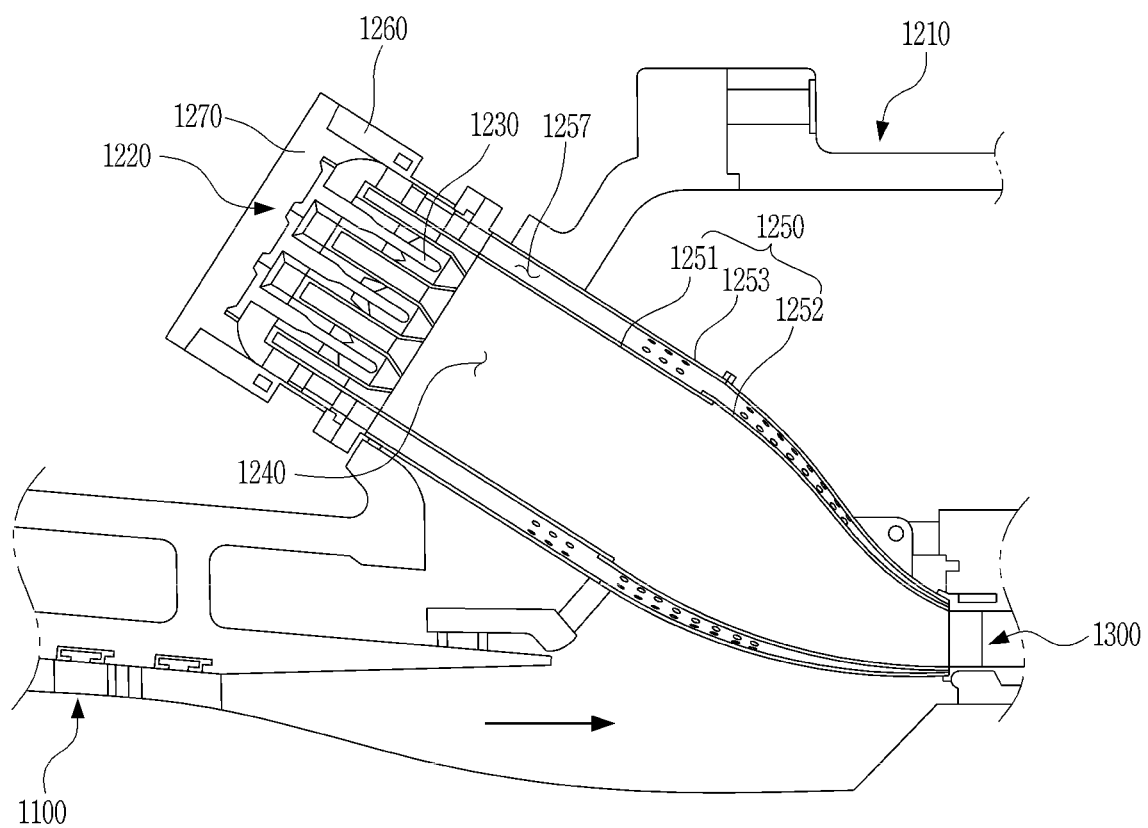
FIG. 2 is a diagram illustrating a combustor of FIG. 1.

FIG. 1 is a diagram illustrating an internal structure of a gas turbine in accordance with an embodiment of the present disclosure, and FIG. 2 is a diagram illustrating a combustor of FIG. 1.

The thermodynamic cycle of the gas turbine 1000 in accordance with the present embodiment may ideally comply with the Brayton cycle. The Brayton cycle may consist of four processes including an isentropic compression (adiabatic compression) process, an isobaric heat supply process, an isentropic expansion (adiabatic expansion) process, and an isobaric heat rejection process. In other words, the gas turbine may draw air from the atmosphere, compress the air to a high pressure, combust fuel under isobaric conditions to emit thermal energy, expand this high-temperature combustion gas to convert the thermal energy of the combustion gas into kinetic energy, and thereafter discharge exhaust gas with residual energy to the atmosphere. As such, the Brayton cycle may consist of four processes including compression, heat addition, expansion, and heat rejection.

Embodying the Brayton cycle, the gas turbine 1000 may include a compressor 1100, a combustor 1200, and a turbine 1300, as illustrated in FIG. 1. Although the following description will be made with reference to FIG. 1, the description of the present disclosure may also be widely applied to a turbine engine having a configuration equivalent to that of the gas turbine 1000 illustrated in FIG. 1.

Referring to FIG. 1, the compressor 1100 of the gas turbine 1000 may draw air from the outside and compress the air. The compressor 1100 may supply air compressed by compressor blades 1130 to the combustor 1200 and also supply air for cooling to a high-temperature region needed to be cooled in the gas turbine 1000. Here, drawn air is compressed in the compressor 1100 through an adiabatic compression process, so that the pressure and the temperature of air passing through the compressor 1100 are increased.

The compressor 1100 is designed in the form of a centrifugal compressor or an axial compressor. Generally, the centrifugal compressor is used in a small gas turbine. On the other hand, in a large gas turbine such as the gas turbine 1000 illustrated in FIG. 1, a multi-stage axial compressor 1100 is generally used so as to compress a large amount of air. Here, in the multi-stage axial compressor 1100, the blades 1130 of the compressor 1100 rotate along with rotation of a rotor disk, compress drawn air, and transfer compressed air to compressor vanes 1140 disposed at a following stage. Air is compressed gradually to high pressures while passing through the blades 1130 formed in a multi-stage structure.

The compressor vanes 1140 may be mounted to an inner surface of the housing 1150 in such a way that a plurality of compressor vanes 1140 form each stage. The compressor vanes 1140 guide compressed air transferred from the compressor blades 1130 disposed at the preceding stage, toward the blades 1130 disposed at the following stage. In an embodiment, at least some of the plurality of compressor vanes 1140 may be mounted so as to be rotatable within a predetermined range, e.g., to adjust the flow rate of air.

The compressor 1100 may be operated using some of the power output from the turbine 1300. To this end, as illustrated in FIG. 1, a rotating shaft of the compressor 1100 may be directly coupled with a rotating shaft of the turbine 1300. In the case of the large gas turbine 1000, almost half of the output produced by the turbine 1300 may be consumed to drive the compressor 1100. Therefore, improvement in efficiency of the compressor 1100 may have a direct effect on increasing the overall efficiency of the gas turbine 1000.

The combustor 1200 may mix fuel with compressed air supplied from an outlet of the compressor 1100 and combust the mixture through an isobaric combustion process to make combustion gas having high energy. FIG. 2 illustrates an example of the combustor 1200 applied to the gas turbine 1000. The combustor 1200 may include a combustor casing 1210, a burner 1220, a nozzle 1230, a duct assembly 1250, and a flow guide member 1400.

The combustor casing 1210 may enclose a plurality of burners 1220 and have an approximately cylindrical shape. The burners 1220 may be disposed at a downstream side of the compressor 1100 and arranged along the combustor casing 1210 having an annular shape. A plurality of nozzles 1230 are provided in each burner 1220. Fuel ejected from the nozzles 1230 is mixed with air at an appropriate ratio to form a mixture having conditions suitable for combustion.

In the gas turbine 1000, gas fuel, liquid fuel, or hybrid fuel formed by a combination of them may be used. It is important to form combustion conditions suitable for reducing the amount of exhaust gas such as carbon monoxide and nitrogen oxide, which should be regulated by law. Recently, use of a pre-mixed combustion scheme has increased because a combustion temperature can be reduced and uniform combustion is possible so that exhaust gas can be reduced, although it is difficult to control the pre-combustion.

In the case of the pre-mixed combustion, compressed air is mixed with fuel ejected in advance from the nozzles 1230, and then enters the combustion chamber 1240. Initial ignition of pre-mixed gas is performed by an igniter. Thereafter, if combustion is stabilized, fuel and air are supplied so that the combustion is maintained.

Referring to FIG. 2, compressed air flows along an outer surface of the duct assembly 1250, which is coupled between the burner 1220 and the turbine 1300 so that high-temperature combustion gas can flow through the duct assembly 1250, and then is supplied toward the nozzles 1230. During this process, the duct assembly 1250 heated by high-temperature combustion gas may be appropriately cooled.

The duct assembly 1250 may include a liner 1251, a transition piece 1252, and a flow sleeve 1253. The duct assembly 1250 has a double-shell structure, in which the flow sleeve 1253 encloses the outer surfaces of the liner 1251 and the transition piece 1252 that are coupled to each other. Compressed air is drawn into a cooling passage 1257 formed inside the flow sleeve 1253, thus cooling the liner 1251 and the transition piece 1252.

The liner 1251 is a tube member coupled to the burner 1220 of the combustor 1200, and an internal space of the liner 1251 forms the combustion chamber 1240. One longitudinal end of the liner 1251 is coupled to the burner 1220, and the other longitudinal end of the liner 1251 is coupled to the transition piece 1252.

The transition piece 1252 is coupled to an inlet of the turbine 1300 and functions to guide high-temperature combustion gas into the turbine 1300. One longitudinal end of the transition piece 1252 is coupled with the liner 1251, and the other longitudinal end of the transition piece 1252 is coupled with the turbine 1300. The flow sleeve 1253 functions to protect the liner 1251 and the transition piece 1252 and prevent high-temperature heat from being directly emitted to the outside.

A nozzle casing 1260 is coupled to an end of the duct assembly 1250. A head end plate 1270 for supporting the nozzles 1230 is coupled to the nozzle casing 1260.

Figure 3:
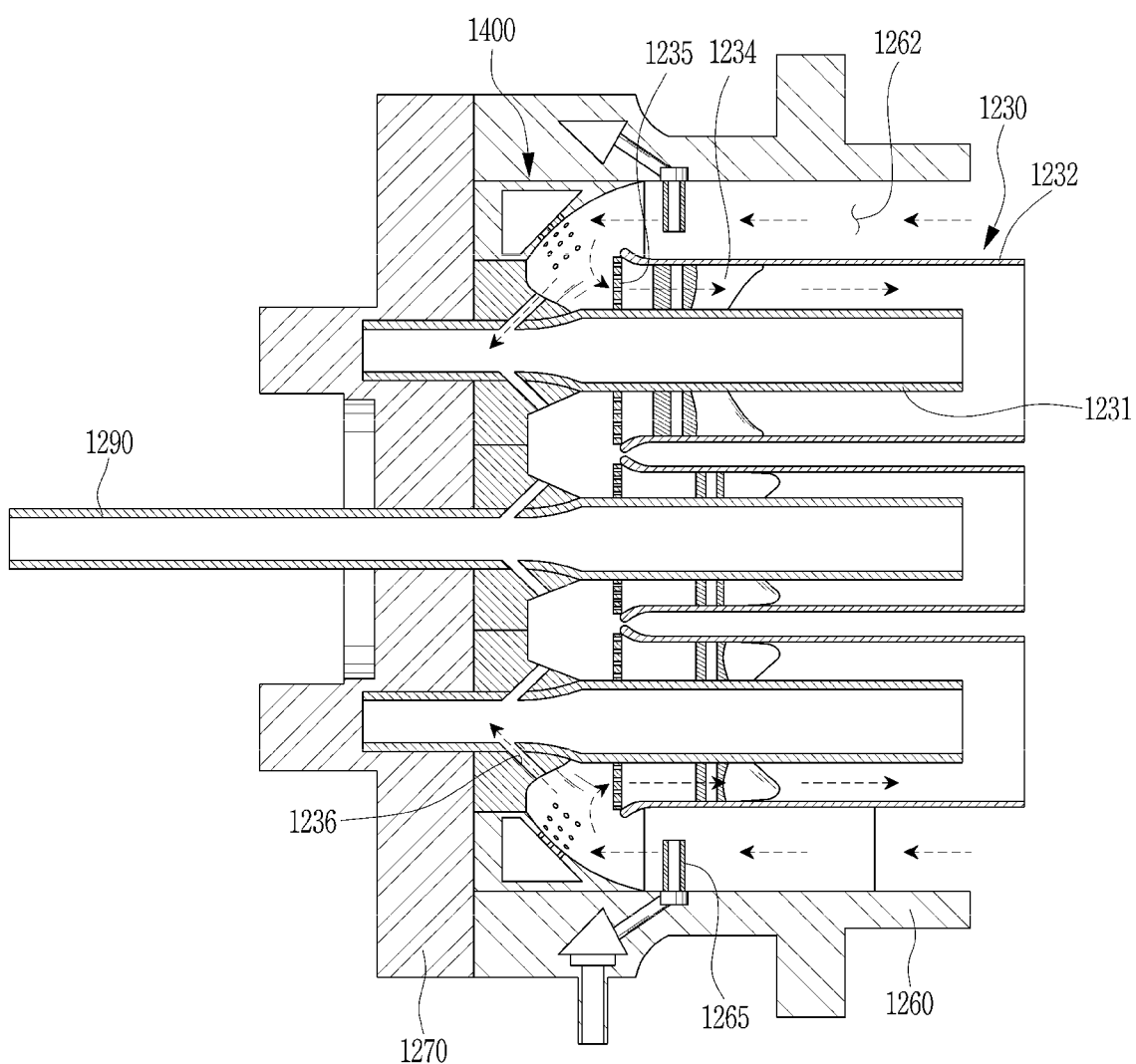
FIG. 3 is a sectional view illustrating a portion of the combustor in accordance with the first exemplary embodiment of the present disclosure.

FIG. 3 is a sectional view illustrating a portion of the combustor in accordance with the first embodiment of the present disclosure.

Referring to FIGS. 2 and 3, the nozzle casing 1260 has an approximately cylindrical tubular shape and is configured to enclose the plurality of nozzles 1230. One end of the nozzle casing 1260 is coupled to the duct assembly 1250, and the other end of the nozzle casing 1260 is coupled to the head end plate 1270. A plurality of auxiliary nozzles 1265 may be installed in the nozzle casing 1260. The auxiliary nozzles 1265 may be arranged at positions spaced apart from each other along the circumferential direction of the nozzle casing 1260.

A flow passage 1262 through which air flows may be formed between the nozzle casing 1260 and the nozzles 1230. Protruding into the flow passage 1262, the auxiliary nozzles 1265 may be installed in the nozzle casing 1260 to inject fuel into the flow passage 1262.

The head end plate 1270 has a circular plate shape, and is coupled with the nozzle casing 1260 to support the nozzles 1230. The plurality of nozzles 1230 and a fuel injector 1290 for supplying fuel to the nozzles 1230 may be installed on the head end plate 1270.

Each nozzle 1230 may include a nozzle tube 1231, a nozzle shroud 1232 configured to enclose the nozzle tube 1231, and a vane 1234 installed between the nozzle tube 1231 and the nozzle shroud 1232 and configured to eject fuel. The nozzle tube 1231 and the nozzle shroud 1232 form a coaxial structure. Fuel and air are supplied into the nozzle tube 1231. A passage along which air flows is formed in the nozzle shroud 1232, and fuel may be injected into the passage.

Air is drawn into gap formed between the nozzle shroud 1232 and the nozzle tube 1231. A perforated plate 1235 for making the flow of air uniform may be installed in the gap. The vane 1234 may induce swirls in the passage formed between the nozzle tube 1231 and the nozzle shroud 1232. A plurality of holes may be formed in the vane 1234 so that fuel is ejected through the plurality of holes.

Air that flows along the cooling passage 1257 is drawn into the nozzle casing 1260 and reaches the head end plate 1270. Furthermore, not only may air be into the gap between the nozzle tube 1231 and the nozzle shroud 1232, but air may also be drawn into the nozzle tube 1231 through a supply passage 1236 and mixed with fuel, and thereafter discharged into the combustion chamber 1240.

The flow guide member 1400 may be disposed on a corner part on which a flow direction of air is changed, and may guide the air such that the air may be easily drawn into the nozzles 1230. The flow guide member 1400 is installed on the corner part where the nozzle casing 1260 and the head end plate 1270 converge, and functions to guide the flow of air. The words "the flow guide member 1400 is installed on the corner part" may embrace not only the case where the flow guide member 1400 is disposed to make contact with the corner part but also the case where the flow guide member 1400 is disposed at a position spaced apart from the corner part by a predetermined distance, and may mean that the flow guide member 1400 is disposed to make it possible to guide air drawn to the corner part.

The flow guide member 1400 may extend in the circumferential direction of the nozzle casing 1260 and have a ring shape, in more detail, a circular annular shape.

Figure 4:
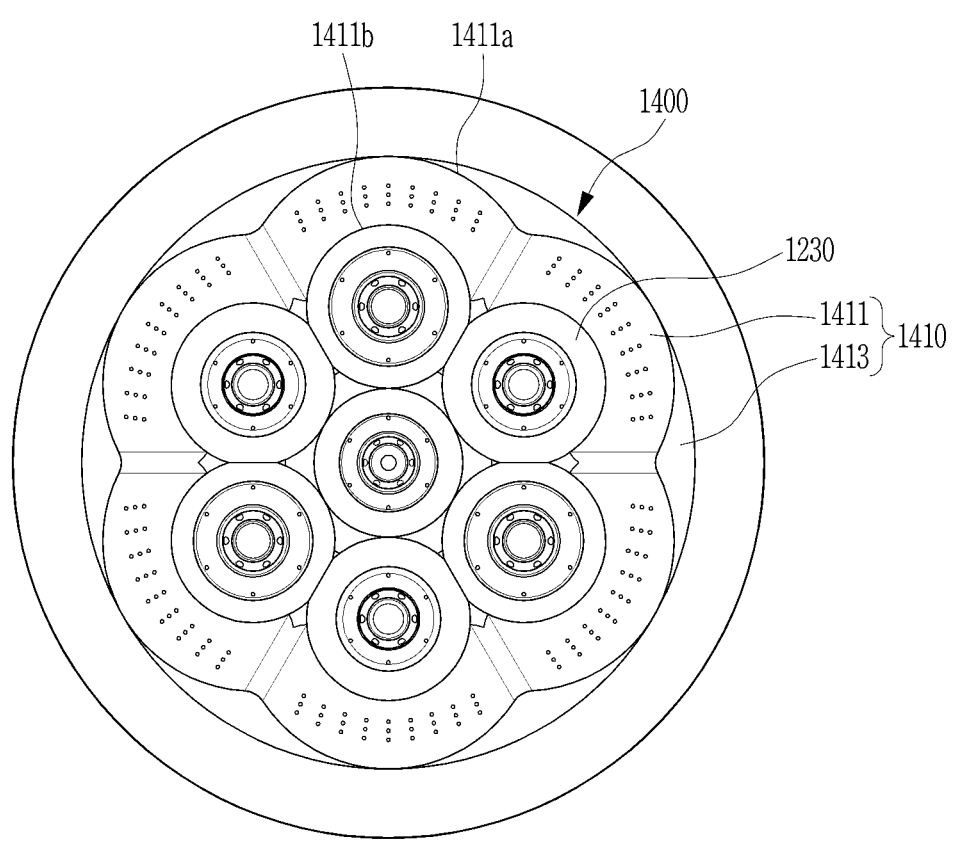
FIG. 4 is a front view illustrating the combustor in accordance with the first exemplary embodiment of the present disclosure.
Figure 5:
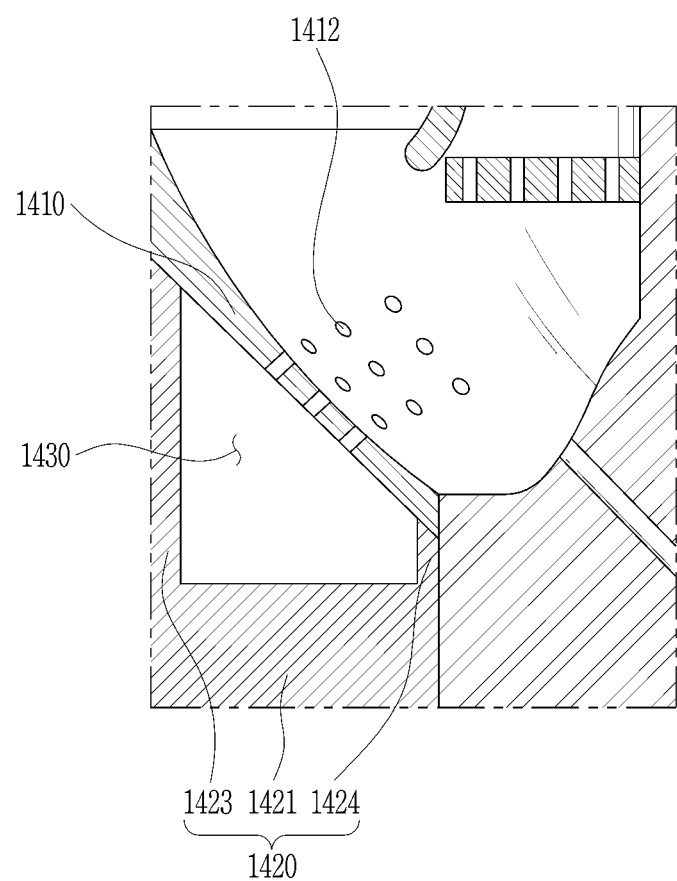
FIG. 5 is a lateral cross-sectional view of a flow guide member in accordance with the first exemplary embodiment of the present disclosure.
Figure 6:
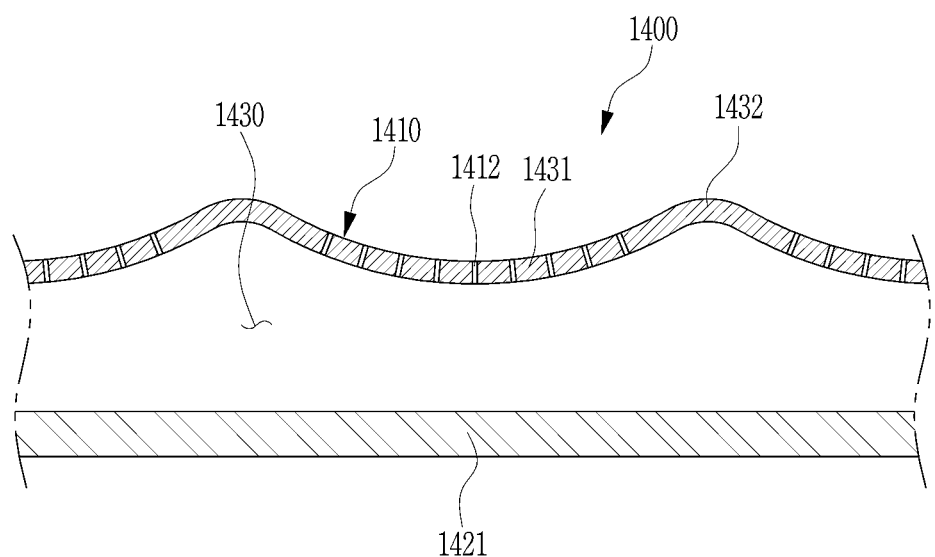
FIG. 6 is a circumferential cross-sectional view of the flow guide member in accordance with the first exemplary embodiment of the present disclosure.

FIG. 4 is a front view illustrating the combustor in accordance with the first embodiment of the present disclosure, FIG. 5 is a lateral cross-sectional view of the flow guide member in accordance with the first embodiment of the present disclosure, and FIG. 6 is a circumferential cross-sectional view of the flow guide member in accordance with the first embodiment of the present disclosure.

Referring to FIGS. 3 to 6, the flow guide member 1400 in accordance with the present embodiment includes a guide plate 1410 and a frame 1420 coupled to the guide plate 1410. The guide plate 1410 extends in a circumferential direction to enclose the nozzles 1230 and have an annular shape, and includes a plurality of curved plates 1411 each of which is concavely recessed, and a support plate 1413 which is coupled to upper ends of the curved plates 1411 and has a planar shape.

Each curved plate 1411 includes an upper end part 1411*a* and a lower end part 1411*b* which are formed in arc shapes. The radius of curvature of the upper end part 1411*a* is greater than the radius of curvature of the lower end part 1411*b*. Furthermore, the curved plate 1411 may be concavely recessed such that opposite side ends thereof are located at positions higher than that of an intermediate portion thereof. The curved plate 1411 may be disposed to be inclined from an upper portion thereof toward a lower portion thereof, and may be concavely recessed in an upper and lower direction.

The plurality of curved plates 1411 are connected to each other by coupling the side ends thereof to each other. Here, as shown in FIG. 6, the guide plate 1410 may have a structure in which concave parts 1431 and convex parts 1432 are alternately formed along the circumferential direction. Hence, air is guided to the concave parts 1431 so that a uniform amount of air may be supplied to each of the nozzles 1230.

The support plate 1413 is disposed in depressions formed between curved lines of the curved plates 1411 so that the upper ends of the curved plates 1411 that are connected with each other may form a circular shape by the support plate 1413. The support plate 1413 functions to prevent leakage of air. As such, if the curved plates 1411 are connected with each other, air may be more uniformly supplied to each of the nozzles 1230.

A plurality of holes 1412 are formed in the curved plate 1411. The holes 1412 are connected with a resonance space 1430 formed between the curved plate 1411 and the frame 1420. The curved plate 1411 is formed such that the thickness of each of the upper and lower ends thereof is greater than the thickness of a central portion thereof. The curved plate 1411 may be formed such that the thickness thereof is gradually increased from the central portion to outer sides.

The frame 1420 includes a bottom plate 1421, a first sidewall 1423 which protrudes from the bottom plate 1421, and a second sidewall 1424 which is disposed inside the first sidewall 1423 and faces the first sidewall 1423. The curved plates 1411 are coupled to an upper end of the frame 1420. The resonance space 1430 is formed between the frame 1420 and the guide plate 1410.

The bottom plate 1421 may extend in an annular shape and be formed of a planar plate. The first sidewall 1423 may have a height greater than that of the second sidewall 1424 and be fixed to an inner wall of the nozzle casing 1260. The second sidewall 1424 may protrude from an inner end of the bottom plate 1421 and has a curved shape so that the second sidewall 1424 may be installed to enclose outer surfaces of the nozzles 1230.

The resonance space 1430 may extend inside the flow guide member in the circumferential direction to have an annular shape, and may have a trapezoidal cross-section. The flow guide member 1400 functions as a Helmholtz resonator for attenuating vibration and noise. The flow guide member 1400 may attenuate vibration which is generated during a combustion process. Here, an attenuated vibration frequency is proportional to an opening area of the hole 1412 and is inversely proportional to the volume of the resonance space 1430 and the depth of the hole 1412. Hence, the attenuated vibration frequency may be set by adjusting the opening area and the volume of the resonance space 1430.

As described above, in accordance with the first embodiment, the flow guide member 1400 is installed at a position at which the direction of the flow path of compressed air is changed, thus preventing occurrence of swirls, and reliably guiding the flow of air. Furthermore, in accordance with the first embodiment, since the resonance space 1430 is formed in the flow guide member 1400, vibration which may occur during a combustion process may be prevented from being transmitted to the nozzles 1230, whereby the nozzles 1230 may be prevented from being damaged by the vibration.

Hereinafter, a gas turbine in accordance with a second embodiment of the present disclosure will be described.

Figure 7:
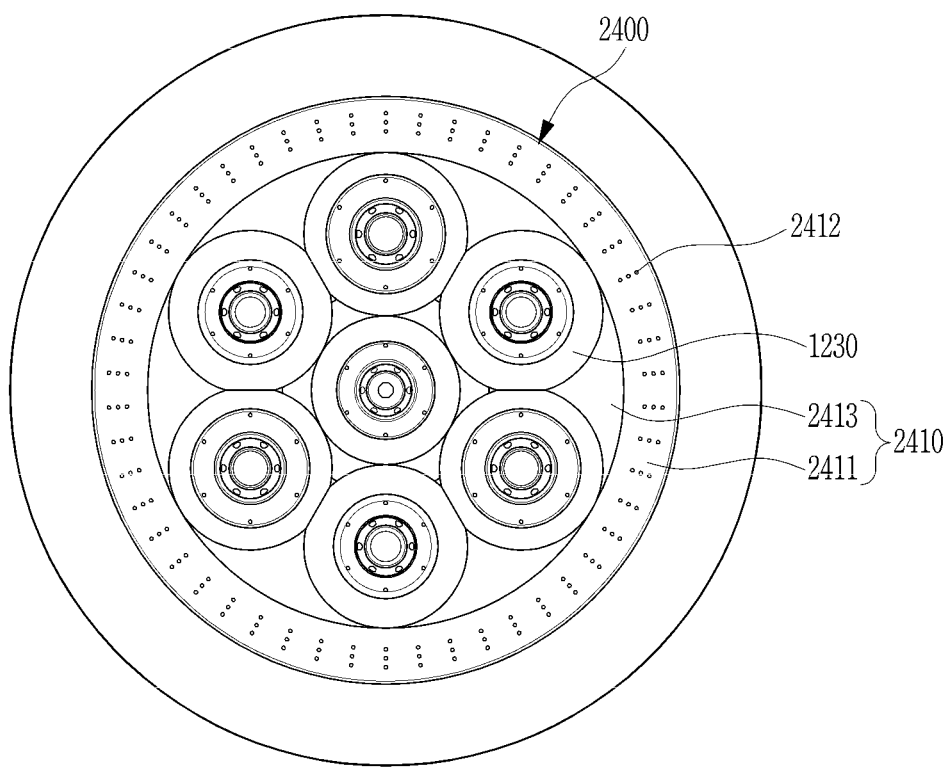
FIG. 7 is a front view illustrating a combustor in accordance with a second exemplary embodiment of the present disclosure.
Figure 8:
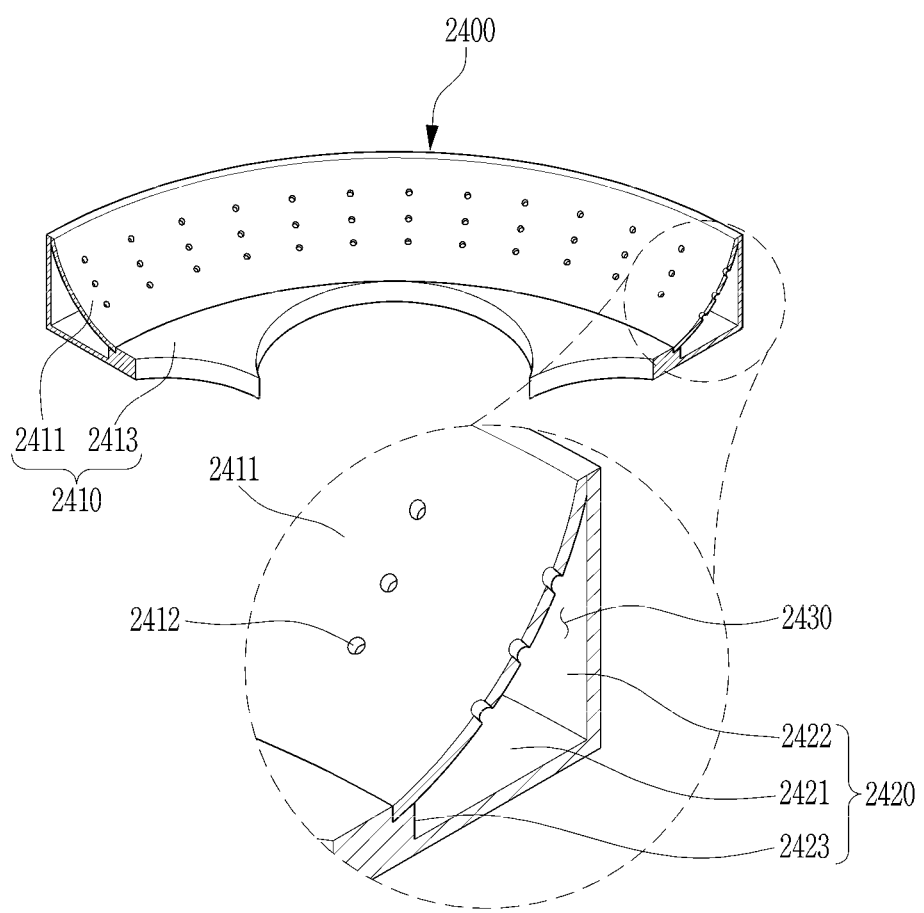
FIG. 8 is an exploded perspective view illustrating a flow guide member in accordance with the second exemplary embodiment of the present disclosure.

FIG. 7 is a front view illustrating a combustor in accordance with the second embodiment of the present disclosure, and FIG. 8 is an exploded perspective view illustrating a flow guide member in accordance with the second embodiment of the present disclosure.

Referring to FIGS. 7 and 8, the structure of the gas turbine in accordance with the second embodiment, except the structure of the flow guide member 2400, is the same as that of the gas turbine in accordance with the first embodiment; therefore, repetitive explanation of the same structure will be omitted.

The flow guide member 2400 in accordance with the second embodiment may be disposed on a corner part on which a flow direction of air is changed, and may guide the air such that the air may be easily drawn into the nozzles 1230. The flow guide member 2400 may extend in the circumferential direction of the nozzle casing and have a ring shape, in more detail, a circular annular shape.

The flow guide member 2400 in accordance with the second embodiment includes a guide plate 2410 and a frame 2420 coupled to the guide plate 2410. The guide plate 2410 extends in the circumferential direction to enclose the nozzles 1230 and have an annular shape. The guide plate 2410 includes a curved plate 2411 and a support plate 2413 which is coupled to a lower end of the curved plate 2411 and formed of a planar plate. The curved plate 2411 may have a circular annular shape, and be disposed to be inclined from an upper portion thereof toward a lower portion thereof and concavely recessed in an upper and lower direction.

The support plate 2413 may be coupled to lower ends of curved plates 2411 connected to each other. A plurality of support plates 2413 may be disposed between the curved plate 2411 and the outer surfaces of the nozzles 1230. An inner surface of the support plate 2413 may be disposed to enclose the nozzles 1230.

A plurality of holes 2412 are formed in the curved plate 2411. The holes 2412 are connected with a resonance space 2430 formed between the guide plate 2410 and the frame 2420. The curved plate 2411 may have a uniform thickness.

The frame 2420 includes a bottom plate 2421, a first sidewall 2422 which protrudes from the bottom plate 2421, and a second sidewall 2423 which is disposed inside the first sidewall 2422 and faces the first sidewall 2422. The curved plate 2411 is coupled to an upper end of the frame 2420. The resonance space 2430 is formed between the frame 2420 and the curved plate 2411. The resonance space 2430 may be formed to extend in the circumferential direction of the flow guide member 2400. Vibration transmitted through the holes 2412 may be attenuated in the resonance space 2430.

As described above, in accordance with the second embodiment, the structure of the flow guide member 2400 may be simplified so that the production and the installation thereof are facilitated, and the production cost may be reduced.

Hereinafter, a gas turbine in accordance with a third embodiment of the present disclosure will be described.

Figure 9:
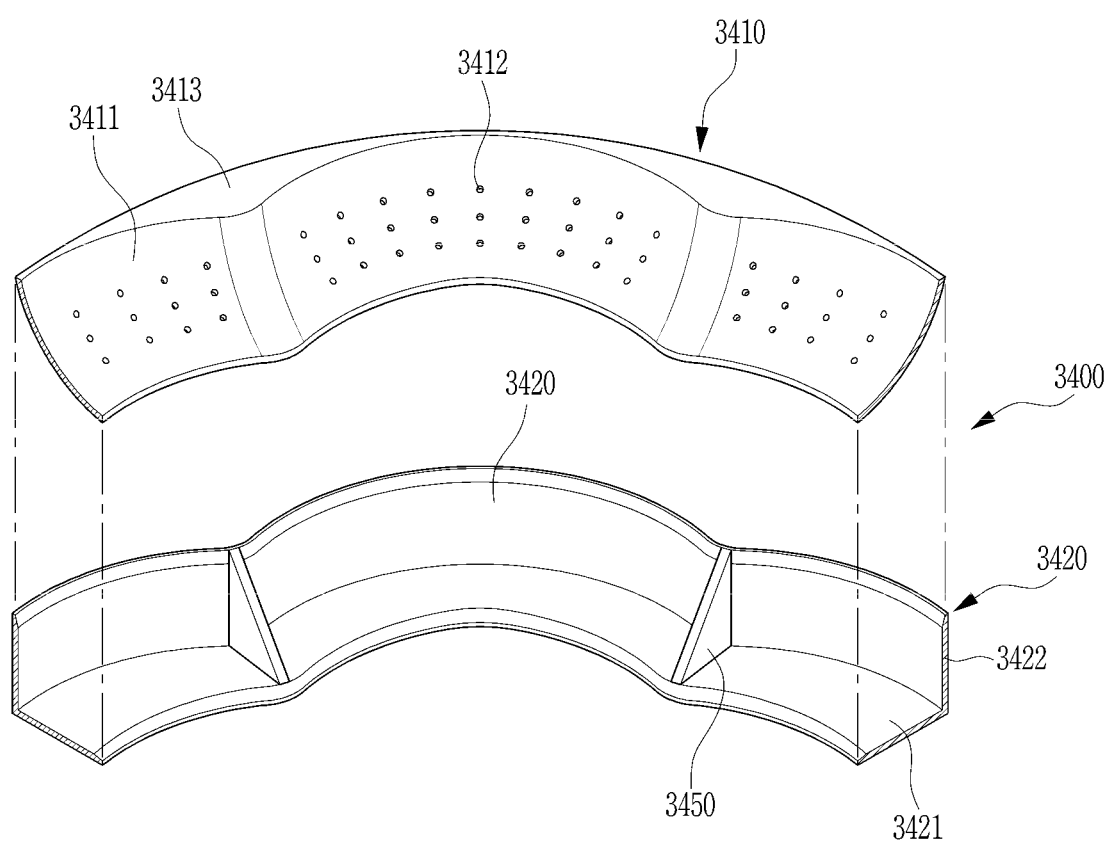
FIG. 9 is an exploded perspective view illustrating a portion of a flow guide member in accordance with a third exemplary embodiment of the present disclosure.
Figure 10:
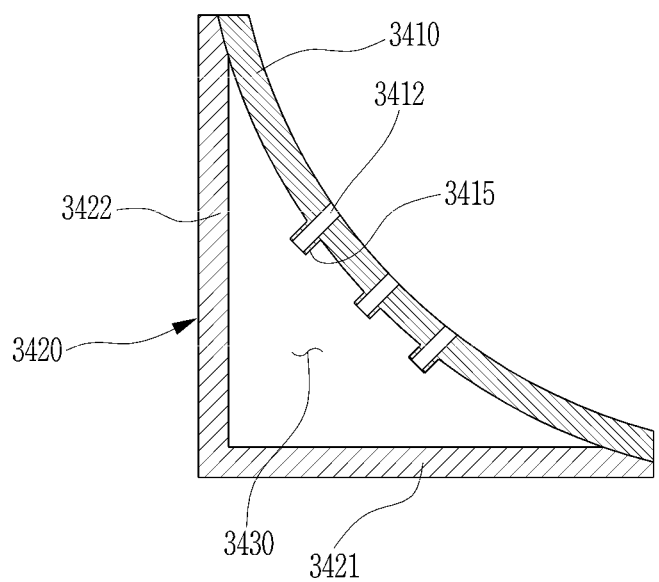
FIG. 10 is a cross-sectional view of the flow guide member in accordance with the third exemplary embodiment of the present disclosure.

FIG. 9 is an exploded perspective view illustrating a portion of a flow guide member in accordance with the third embodiment of the present disclosure. FIG. 10 is a cross-sectional view of the flow guide member in accordance with the third embodiment of the present disclosure.

Referring to FIGS. 9 and 10, the structure of the gas turbine in accordance with the third embodiment, except the structure of the flow guide member 3400, is the same as that of the gas turbine in accordance with the first embodiment; therefore, repetitive explanation of the same structure will be omitted.

The flow guide member 3400 in accordance with the third embodiment may be disposed on a corner part on which a flow direction of air is changed, and may guide the air such that the air may be easily drawn into the nozzles. The flow guide member 3400 may extend in the circumferential direction of the nozzle casing and have a ring shape, in more detail, a circular annular shape.

The flow guide member 3400 in accordance with the third embodiment includes a guide plate 3410 and a frame 3420 coupled to the guide plate 3410. The guide plate 3410 extends in the circumferential direction to enclose the nozzles and have an annular shape. The guide plate 3410 includes a plurality of curved plate 3411 each of which is concavely recessed, and a support plate 3413 which is coupled to upper ends of the curved plates 3411 and formed of a planar plate. A plurality of holes 3412 are formed in the guide plate 3410. The holes 3412 are connected with a resonance space 3430 formed between the guide plate 3410 and the frame 3420.

Protruding tubes 3415 that are coupled to the respective holes 3412 and protrude into the resonance space 3430 are installed on the guide plate 3410. Each of the protruding tubes 3415 may protrude from an inner surface of the guide plate 3410 by a predetermined length. Since an attenuated frequency by the Helmholtz resonator is inversely proportional to the length of the hole 3412, an attenuable frequency may be more easily controlled if the protruding tubes 3415 are provided. Furthermore, since the protruding tubes 3415 protrude into the resonance space 3430, the flow of air is not impeded by the protruding tubes 3415.

The frame 3420 includes a bottom plate 3421 and a first sidewall 3422 protruding from the bottom plate 3421. The guide plate 3410 is coupled to the bottom plate 3421 and the first sidewall 3422. The resonance space 3430 is formed between the guide plate 3410 and the bottom plate 3421.

A plurality of partitions 3450 are installed in the frame 3420. The partitions 3450 are fixed to the bottom plate 3420 and the first sidewall 3422. The partitions 3450 divide an internal space of the frame 3420 to form a plurality of resonance spaces 3430. The resonance space 3430 may have an approximately triangular cross-section.

The volume of each of the resonance spaces 3430 may be adjusted depending on the distance between installed partitions 3450 and the number of partitions 3450. Since an attenuated frequency by the Helmholtz resonator is inversely proportional to the volume of the resonance space 3430, an attenuable frequency may be more easily controlled if the partitions 3450 are provided.

It can be said that the present disclosure may provide a combustor comprising: a burner, including a plurality of nozzles, configured to eject fuel and air; and a duct assembly, coupled to one side of the burner, configured to combust the fuel and the air therein, and transfer combustion gas to a turbine, wherein the burner comprises a flow guide member configured to guide a flow of air to be drawn into the nozzles, and a plurality of holes are formed in the flow guide member. Here, a resonance space may be formed in the flow guide member and communicates with the plurality of holes. And, the flow guide member comprises a guide plate, and a frame coupled to the guide plate and configured to form the resonance space. Also, the frame may comprise a guide plate, and a frame coupled to the guide plate and configured to form the resonance space. The frame may further comprise a bottom plate, a first sidewall protruding from the bottom plate, and a second sidewall disposed inside the first sidewall and facing the first sidewall, wherein the first sidewall may have a height greater than a height of the second sidewall, wherein the second sidewall may be formed in a curved shape and installed to enclose outer surfaces of the nozzles. The guide plate may extend in a circumferential direction to enclose the nozzles and have an annular shape, the guide plate may include a plurality of curved plates, and the guide plate may include a support plate coupled to upper ends of the curved plates and formed of a planar plate.

Here, each of the plurality of curved plates may be formed such that a thickness of each curved plate is gradually increased from a central portion thereof to an upper or lower end thereof. And, the curved plates may be coupled at side ends thereof to each other, and the guide plate comprises a plurality of concave parts and a plurality of convex parts which are alternately formed along a circumferential direction. Each of the plurality of curved plates includes an upper end part and a lower end part which are formed in an arc shape, and a radius of curvature of the upper end part is greater than a radius of curvature of the lower end part. Also, the resonance space may extend in the flow guide member in a circumferential direction to have an annular shape. The plurality of partitions, configured to divide an internal space of the frame to form a plurality of resonance spaces, may be installed in the frame. Also, protruding tubes, coupled to the respective holes and protruding into the resonance space, may be installed on the guide plate.

Also, it can be said that the present disclosure provide a gas turbine comprising: a compressor configured to compress air drawn thereinto from an outside; a combustor configured to mix fuel with the air compressed by the compressor and combust a mixture of the fuel and the compressed air; and a turbine, including a plurality of turbine blades, configured to be rotated by combustion gas formed by the combustor, wherein the combustor comprises a burner having a plurality of nozzles configured to eject fuel and air, and a duct assembly coupled to one side of the burner and configured to combust the fuel and the air therein, transfer combustion gas to a turbine, and wherein the burner comprises a flow guide member installed on a corner part and configured to guide a flow of air to be drawn into the nozzles, the flow guide member being configured as a resonator configured to attenuate vibration. Here, a resonance space is formed in the flow guide member and communicates with the holes, and the flow guide member comprises a guide plate, and a frame coupled to the guide plate and configured to form the resonance space. And, the frame may comprise a bottom plate, a first sidewall protruding from the bottom plate, and a second sidewall disposed inside the first sidewall and facing the first sidewall, wherein the first sidewall has a height greater than a height of the second sidewall. The guide plate may include a plurality of curved plates, and a support plate coupled to upper ends of the curved plates and formed of a planar plate. Also, each of the plurality of curved plates is formed such that a thickness of each curved plate is gradually increased from a central portion thereof to an upper or lower end thereof.

As described above, in a combustor and a gas turbine in accordance with various exemplary embodiments of the present disclosure, exemplary embodiments of the present application obtain advantageous effects that compressed air may be guided and thus prevented from swirling, and vibration which may be generated during a combustion process may be reduced.

While the present disclosure has been described with respect to the various embodiments, it will be apparent to those skilled in the art that various changes or modifications of the present disclosure and the claimed invention are directly or indirectly motivated and embodied by adding, changing, or deleting components without departing from the spirit and scope of the claimed invention as defined in the following claims. It should be noted that these changes or modifications also fall within the bounds of the present disclosure.

What is claimed is:

1. A combustor comprising:
a burner, including a plurality of nozzles, configured to eject a fuel and an air; and
a duct assembly, coupled to one side of the burner, configured to:
combust the fuel and the air therein, and
transfer a combustion gas to a turbine,
wherein the burner comprises:
a flow guide member configured to guide a flow of the air to be drawn into the plurality of nozzles,
wherein the flow guide member comprises a guide plate including a curved plate, and a plurality of holes are formed along a curve of the curved plate, wherein the guide plate includes a support plate coupled to lower ends of the curved plate and formed of a planar plate and configured to be disposed between the curved plate and outer surfaces of the nozzles, and
a frame directly connecting both the curved plate and the support plate to form a resonance space that communicates with the plurality of holes such that the resonance space is enclosed by the curved plate.

2. The combustor according to claim 1, wherein the frame comprises
a bottom plate,
a first sidewall protruding from the bottom plate, and
a second sidewall disposed inside the first sidewall and facing the first sidewall,
wherein the first sidewall has a height greater than a height of the second sidewall.

3. The combustor according to claim 2, wherein the second sidewall is formed in a curved shape and installed to enclose the outer surfaces of the nozzles.

4. The combustor according to claim 1, wherein the guide plate extends in a circumferential direction to enclose the nozzles and have an annular shape.

5. The combustor according to claim 1, wherein the guide plate includes a plurality of curved plates.

6. The combustor according to claim 5, wherein the support plate is coupled to upper ends of the curved plates.

7. The combustor according to claim 6, wherein the curved plates are coupled at side ends thereof to each other, and the guide plate comprises a plurality of concave parts and a plurality of convex parts which are alternately formed along a circumferential direction.

8. The combustor according to claim 5, wherein each of the plurality of curved plates is formed such that a thickness of each curved plate is gradually increased from a central portion thereof to an upper or lower end thereof.

9. The combustor according to claim 5, wherein each of the plurality of curved plates includes an upper end part and a lower end part which are formed in an arc shape, and a radius of curvature of the upper end part is greater than a radius of curvature of the lower end part.

10. The combustor according to claim 1, wherein the resonance space extends in the flow guide member in a circumferential direction to have an annular shape.

11. The combustor according to claim 1, wherein a plurality of partitions, configured to divide an internal space of the frame to form a plurality of resonance spaces, are installed in the frame.

12. The combustor according to claim 1, wherein protruding tubes, coupled to the respective holes and protruding into the resonance space, are installed on the guide plate.

13. The combustor according to claim 2, wherein the burner further includes
a nozzle casing coupled to the duct assembly and configured to enclose the nozzles, and
a head end plate configured to support the nozzles, and
wherein the flow guide member is installed on a corner part where the nozzle casing and the head end plate converge.

14. A gas turbine comprising:
a compressor configured to compress an air drawn thereinto from an outside;
a combustor configured to mix a fuel with the air compressed by the compressor and combust a mixture of the fuel and the compressed air; and
a turbine, including a plurality of turbine blades, configured to be rotated by a combustion gas formed by the combustor,
wherein the combustor comprises:
a burner having a plurality of nozzles configured to eject the fuel and the air, and
a duct assembly coupled to one side of the burner and configured to combust the fuel and the air therein, transfer the combustion gas to a turbine, and
wherein the burner comprises:
a flow guide member installed on a corner part and configured to guide a flow of air to be drawn into the plurality of nozzles, the flow guide member being configured as a resonator configured to attenuate vibration,
wherein the flow guide member comprises a guide plate including a curved plate, and a plurality of holes are formed along a curve of the curved plate, wherein the guide plate includes a support plate coupled to lower ends of the curved plate and formed of a planar plate and configured to be disposed between the curved plate and outer surfaces of the nozzles, and
a frame directly connects both the curved plate and the support plate to form the resonator that communicates with the plurality of holes such that the resonator is enclosed by the curved plate.

15. The gas turbine according to claim 14, wherein the frame comprises a bottom plate,
a first sidewall protruding from the bottom plate, and
a second sidewall disposed inside the first sidewall and facing the first sidewall,
wherein the first sidewall has a height greater than a height of the second sidewall.

16. The gas turbine according to claim 14, wherein the guide plate includes a plurality of curved plates.

17. The gas turbine according to claim 16, wherein each of the plurality of curved plates is formed such that a thickness of each curved plate is gradually increased from a central portion thereof to an upper or lower end thereof.

* * * * *